United States Patent
Barber et al.

(10) Patent No.: US 9,058,344 B2
(45) Date of Patent: Jun. 16, 2015

(54) SUPPORTING FLEXIBLE TYPES IN A DATABASE

(71) Applicant: International Business Machines Corporation, Armonk, NY (US)

(72) Inventors: Ronald J. Barber, San Jose, CA (US); Guy M. Lohman, San Jose, CA (US); Vijayshankar Raman, Sunnyvale, CA (US); Richard S. Sidle, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 13/755,695

(22) Filed: Jan. 31, 2013

(65) Prior Publication Data

US 2014/0214900 A1    Jul. 31, 2014

(51) Int. Cl.
*G06F 17/30* (2006.01)

(52) U.S. Cl.
CPC ............................. *G06F 17/30294* (2013.01)

(58) Field of Classification Search
CPC ................. G06F 17/30289; G06F 17/30292; G06F 17/30294; G06F 17/30312; G06F 17/30315; G06F 17/30595
USPC .......................... 707/790, 791, 801, 802, 803
See application file for complete search history.

(56) References Cited

U.S. PATENT DOCUMENTS

| 6,134,542 | A | 10/2000 | Rustige |
| 7,672,966 | B2 | 3/2010 | Molnar et al. |
| 2010/0169158 | A1* | 7/2010 | Agarwal et al. ................. 705/10 |
| 2010/0205227 | A1* | 8/2010 | Weissman et al. ............ 707/803 |
| 2011/0196866 | A1 | 8/2011 | Cooper |
| 2012/0041986 | A1 | 2/2012 | Weissman et al. |

* cited by examiner

*Primary Examiner* — Hares Jami
(74) *Attorney, Agent, or Firm* — Ference & Associates LLC (57) ABSTRACT

Providing database support. A first group of data are received, the first group of data being expressed in a first format, and a second group of data are received, the second group of data being expressed in a second format, the second format being different from the first format. The first and second groups of data are merged, and are represented in at least one common column. Such representing includes: maintaining the first and second formats; and providing a tuple map which provides reference to the first and second formats.

16 Claims, 5 Drawing Sheets

|  Column A | Column B |
|---|---|
| 200.2322 | 1.1 |
| 800.1321 | -2.0 |

← 317

| 900 | 3.2 |
|---|---|
| 179 | 4.7 |

← 319

| 100 | 23.32 |
|---|---|
| 679 | 34.37 |
| 200 | 31.31 |

← 321

| 20.1290 | -92.02 |
|---|---|
| 640.1423 | 40.00 |

SUPPORTING FLEXIBLE TYPES IN A DATABASE

BACKGROUND

Conventional information management systems can be highly structured and schema-heavy, and efforts have been made to render them more semi-structured. While there does happen to exist a large body of work on XML (extensible markup language) and semi-structured information management systems, such systems still severely lag their structured counterparts in performance.

BRIEF SUMMARY

In summary, one aspect of the invention provides a method comprising: receiving a first group of data, the first group of data being expressed in a first format; receiving a second group of data, the second group of data being expressed in a second format, the second format being different from the first format; merging the first and second groups of data; and representing the first and second groups of data in at least one common column; said representing comprising: maintaining the first and second formats; and providing a tuple map which provides reference to the first and second formats.

Another aspect of the invention provides an apparatus comprising: at least one processor; and a computer readable storage medium having computer readable program code embodied therewith and executable by the at least one processor, the computer readable program code comprising: computer readable program code configured to receive a first group of data, the first group of data being expressed in a first format; computer readable program code configured to receive a second group of data, the second group of data being expressed in a second format, the second format being different from the first format; computer readable program code configured to merge the first and second groups of data; computer readable program code configured to represent the first and second groups of data in at least one common column via: maintaining the first and second formats; and providing a tuple map which provides reference to the first and second formats.

An additional aspect of the invention provides a computer program product comprising a computer program product for providing database support, the computer program product comprising a computer readable storage medium having computer readable program code embodied therewith, the computer readable program code being executable by a computer to: receive a first group of data, the first group of data being expressed in a first format; receive a second group of data, the second group of data being expressed in a second format, the second format being different from the first format; merge the first and second groups of data; and represent the first and second groups of data in at least one common column via: maintaining the first and second formats; and providing a tuple map which provides reference to the first and second formats.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
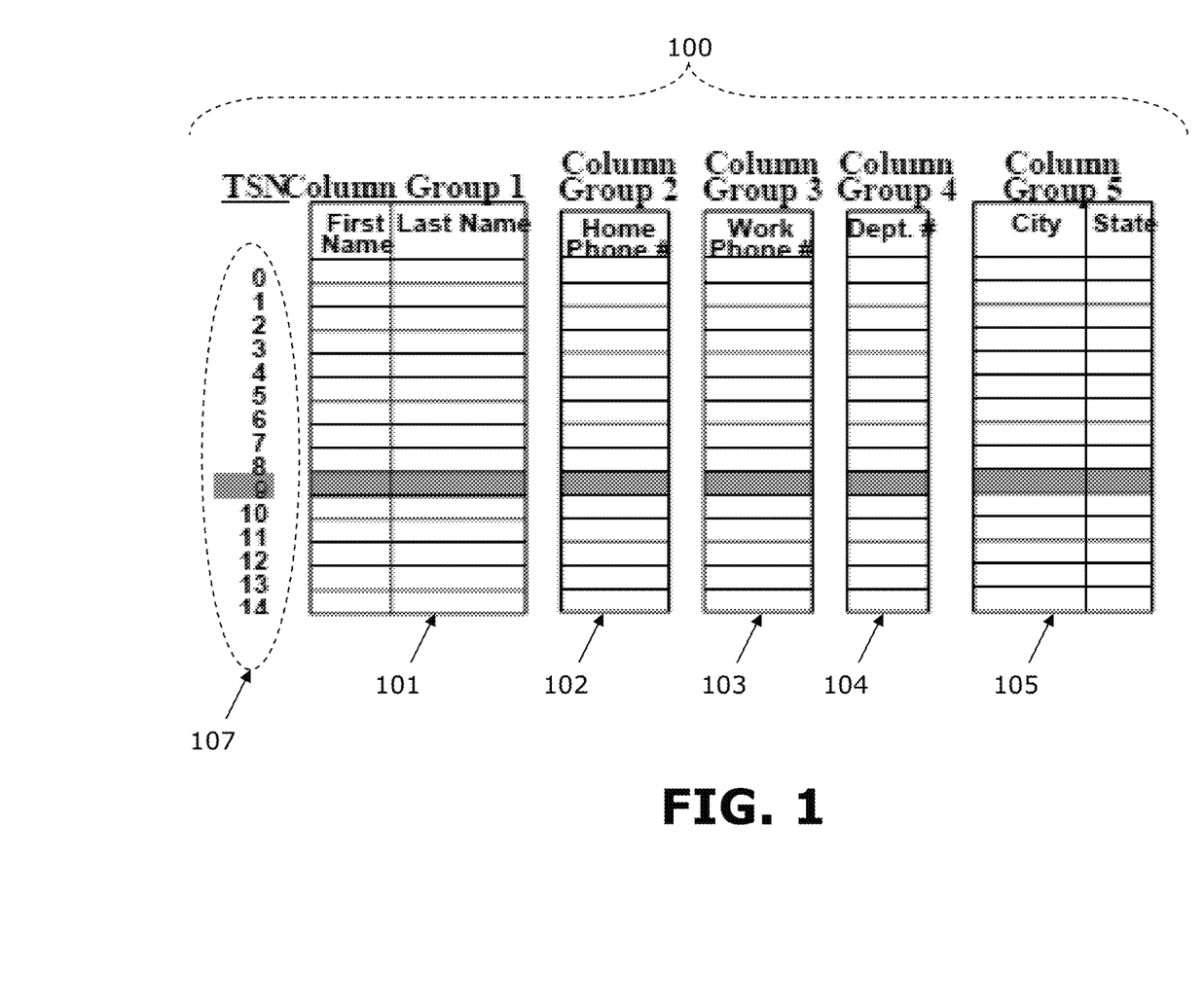
FIG. 1 depicts a column store with several column groups.
Figure 2:
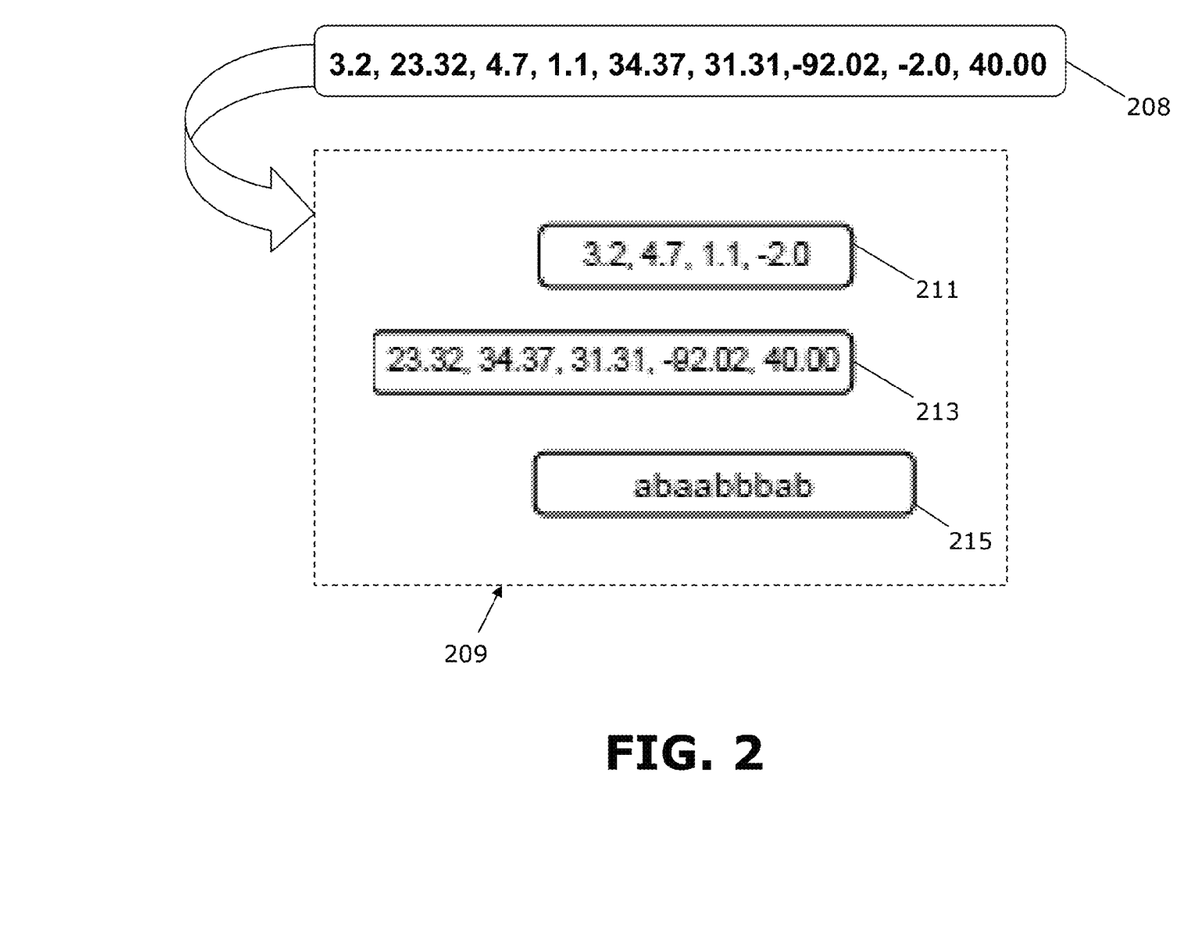
FIG. 2 provides an example of a set of different data partitions and a tuple map.

Specific reference will now be made herebelow to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 5. In accordance with an example embodiment, most if not all of the process steps, components and outputs discussed with respect to FIGS. 1-3 can be performed or utilized by way of a processing unit or units and system memory such as those indicated, respectively, at 16' and 28' in FIG. 5, whether on a server computer, a client computer, a node computer in a distributed network, or any combination thereof.

In accordance with at least one embodiment of the invention, starting from a structured side or approach, there are broadly contemplated herein methods that permit two relaxations of structure that do not sacrifice performance. These relaxations include a capability for an attribute to have data of multiple data types (e.g., as may be employed in SQL language, DECIMAL(3,2), DECIMAL(4,2), INTEGER), so that users need not specify the data type up front, as well as a capability for an attribute to be very sparse (i.e., have a large fraction of NULL values), without affecting compression or query speed. Particularly, the latter ("sparseness" capability) allows the database to support very wide schemas, e.g., potentially with thousands of attributes, of which only some would be non-null in each record, without losing query or compression efficiency.

Generally, it can be noted that SQL DBMSs (database management systems) have a rigid type system, in which the database administrator (DBA) has to specify the detailed data type for every column up front when the database is created. Once a data type has been chosen, it is very difficult to change afterwards, so the DBA usually must anticipate all future usages. As such, DBAs can err on the side of caution and pick very conservative types, but this then runs the risk of causing space and time inefficiency (e.g., excessive precision/scale DECIMALs, long strings, or using variable-length strings, even if at that time all usages need only fixed-length strings, etc). Further, such "conservative picking" can prove to be a tricky task for large schemas, especially for numeric types. The DBA must usually therefore choose proactively between various types, e.g., INTEGER, FLOAT, DECIMAL, or DECFLOAT, and—if DECIMAL—the scale and precision. Similarly, for TIMESTAMP types, a DBA normally has to predict whether accuracy is needed to seconds, or microseconds, or even to a smaller scale. These predictive tasks thus can contribute to a heightened difficulty-of-use and slower time-to-value of a DBMS.

As such, it is additionally recognized that, over time, due to events such as mergers and acquisitions, an initial design occasionally becomes a problem. (The events could be of a large scale, such as companies or concerns that are combining that then have to combine databases on a large scale, or could be of a smaller scale. In the latter case, there could be to start a database initially intended for a very narrow application, which then expands its scope at a later time.) For instance, if a data warehouse declares a column as INTEGER, but a newly acquired unit uses a DECIMAL for that column, a challenge can easily be presented if that unit's database must be merged into the warehouse. Current solutions tend to be problematic for a variety of reasons.

In accordance with at least one embodiment of the invention, there is broadly contemplated herein an arrangement which supports heterogeneous types for the same column within the same table of a DBMS. At the same time, the solution clusters the data by type, so that in the data format there are long runs of homogenous types, thereby not adversely affecting query efficiency.

As such, in accordance with at least one embodiment of the invention, two models of flexible types are broadly contemplated. A first model involves type flexibility within each basic type. More particularly, the DBA can specify, by way of illustrative examples, DECIMAL instead of DECIMAL (prec, scale), GENERAL_INTEGER instead of SMALLINT/INT/BIGINT and STRING instead of CHAR(N) or VARCHAR(N). A second model involves type flexibility across numeric types. Here, by way of illustrative examples, the DBA can specify EXACT_NUMBER if SMALLINT/INT/BIGINT/DECIMAL is desired, and APPROX_NUMBER if REAL/DOUBLE/DECFLOAT is desired. This requires the application to chose custom query semantics, because the rules for inferring types in SQL vary by the data type. In contrast to the first model, in which SQL semantics can be applied directly, the second model requires the application to pick a consistent type inference rule for SQL expressions. Embodiments of the present invention can broadly encompass either or both of these "first" and "second" models.

In accordance with at least one embodiment of the invention, every value for a flexible-type column is stored using the smallest type that will fit it. If a DECIMAL value, the "smallest type" would be represented by the minimum precision or scale needed to avoid information loss. If an INTEGER value, the "smallest type" would be represented by the smallest size INTEGER type that will hold this value (which itself would be subject to the rules of the DBMS; typically the only supported sizes tend to be 16, 32, and 64 bits long). NULL values are assigned to the smallest-size type among the flexible types supported for that column (e.g., SMALLINT, for a GENERAL_INTEGER column). If the input data for a column is very diverse, the data can also be coarsified into a small number of allowed types, as configured by the user.

Generally, embodiments of the invention address a challenge as to how to support such multiple representations within each column while maintaining runs of fixed-length values, for query processing efficiency and compression efficiency, and to allow infrastructure such as indexes to apply to the column. As such, there are broadly proposed herein two data formats to address this challenge. The first applies to databases that store data in column-major fashion (which are exploited by most newer DBMSs intended for read-mostly analytic queries, and also by many DBMSs storing semi-structured data). The second applies towards databases that store data in row-major fashion (which are utilized by most traditional DBMSs intended primarily for transaction processing).

In accordance with at least one embodiment of the invention, intra-block partitioning is applied to column-major databases. As such, in a column-major database, each page holds values for only one column (or a small number thereof, called column groups). A crucial property in such a "column store" is that all columns are laid out in the same order: this is what allows records to be "stitched back" together without inefficiently having to store a row identifier with each value. FIG. 1 depicts a typical column store 100 with several column groups. Column groups 1 and 5 (indicated at 101 and 105, respectively) are shown to contain two columns each, while column groups 2 through 4 (indicated at 102 through 104, respectively) are shown to contain one column each. As shown in FIG. 1, the columns are logically in the same order, as indicated by the set of tuple-sequence numbers (TSNs) 107 at the left. Rows of each column are presumed to have a one-to-one correspondence with one another, and such correspondence defines thereby defines rows of the table. (For instance, in FIG. 1, a row is constituted, at least in part, by the grey-shaded cells corresponding to tuple-sequence number (TSN) 9.)

As broadly contemplated herein, in accordance with at least one embodiment of the invention, this common ordering across columns—that is, an original ordering of all tuples—is essentially violated when tuples are partitioned into separate blocks. A tuple map addresses this challenge. Particularly, within each block, column values could be partitioned in accordance with data type; in other words, data corresponding to one particular type will be present in one block while data corresponding to another particular type will be present in another block. This partitioning is temporarily "stable" merely in the sense that, within each partition, values are stored with respect to each other in a relative order that corresponds to their original relative ordering. Thus, as an illustrative example, values that were $2^{nd}$ and $4^{th}$ in the original order, and which are of a common data type, could then be ordered $1^{st}$ and $2^{nd}$, respectively, once in a partitioned block corresponding to that data type. Accordingly, their relative order of these values would be maintained once values corresponding to one or more other data types (which may have been preceding, intervening or following in the original order) are removed (i.e., assigned to one or more other partitioned blocks). Consequently, when there is a need to stitch a record back together from the partitioned blocks, the original (pre-partitioned) ordering of the values will have been undone and, without corrective measures, lost. Thus, a tuple map, as broadly contemplated herein, is maintained to indicate which partition each tuple (or value) belongs to while still maintaining a record or "memory" of the original ordering of all (non-partitioned) tuples or values.

In accordance with at least one embodiment of the invention, the aforementioned tuple map is an array that takes up log (# of partitions) bits per column, and is stored in the original record order (i.e., it is not partitioned). FIG. 2 provides an example of a set 209 of different data partitions and a tuple map. Particularly, FIG. 2 shows partitions 211 and 213, respectively, based on DECIMAL(2,1) and based on DECIMAL(4,2), and also shows a tuple map 215. Thus, while the original data block (shown separately at 208) contains values 3.2, 23.32, 4.7, 1.1, 34.37, 31.31, −92.02, −2.0, 40.00, (which, for instance, can have come about from a merging of two different databases that express numbers in different manners), the two partitions 211/213 represent a splitting of the block, and values a and b in the tuple map 215 refer to the first and second partitions, 211 and 213, respectively. One or two bits are usually sufficient for the tuple map entries, when the block holds only a small number of distinct partitions.

In accordance with at least one embodiment of the invention, the second approach, applicable to row-major databases, is to partition a data table by data type. Here, a cross-product is taken of all the (coarsified) data types encountered in all the flexible type columns, and a separate partition is formed for each element of this cross-product. Thus, each partition of the table has records of homogeneous type. The size of the cross-product can be limited by combining many small partitions into a single partition, such that columns in this partition are of a data type that represents the coarsification of the corresponding data types in the small partitions that were combined.

Figure 3:
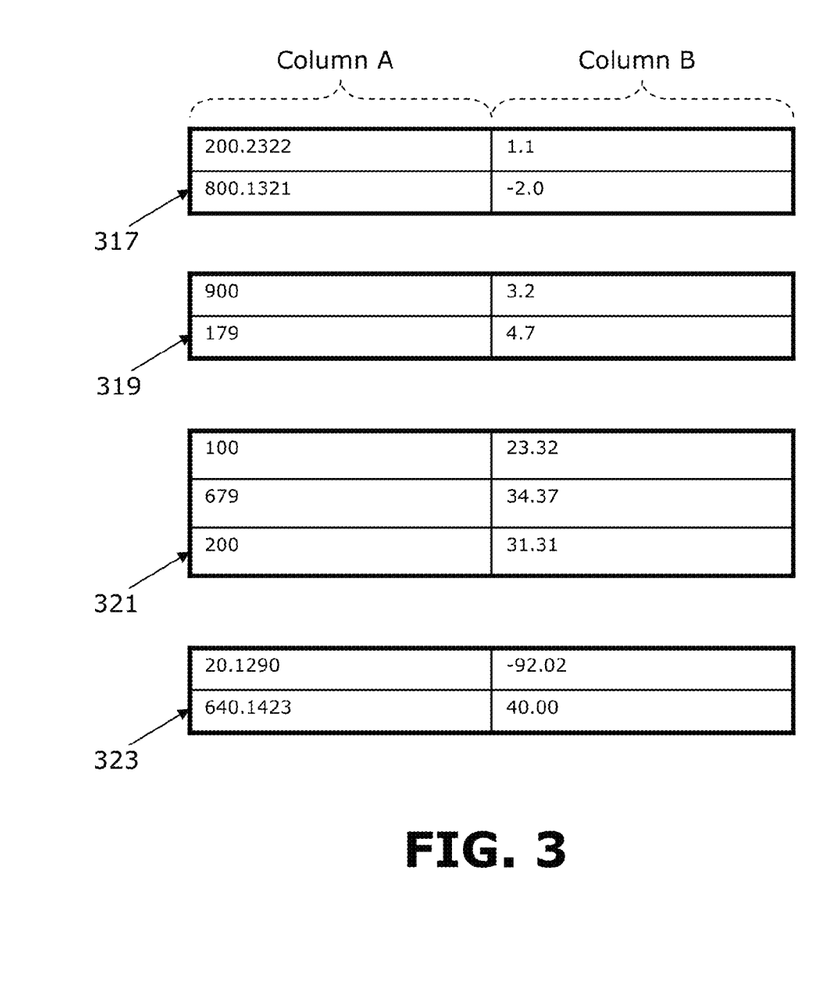
FIG. 3 provides an example of row-major data partitioning.

FIG. 3 shows an illustrative example of row-major partitioning, in the context of at least one embodiment of the present invention. Shown are four different partitions 317, 319, 321 and 323, with respect to two columns ("Column A" and "Column B"). Thus, each partition presents two different data types, as follows:

in partition 317, Column A is DECIMAL(7,4) and Column B is DECIMAL(2,1);
in partition 319, Column A is INTEGER and Column B is DECIMAL(2,1);
in partition 321, Column A is INTEGER and Column B is DECIMAL(4,2); and
in partition 319, Column A is DECIMAL(7,4) and Column B is DECIMAL(4,2).

Generally, in the context of at least one embodiment of the present invention, the data format can have crucial implications for the performance of query operations over that format. In most databases, some query operations are applied directly on the data in its underlying data format, as part of the data access operators (in the literature, this is called "pushing down" operations). Typically, predicates that filter records of the table are applied this way, either using indexes or via table scans.

A significant disadvantage of conventional solutions, such as using a view that coalesces multiple types, is that they often disable such pushed-down operations (inasmuch as pushed-down operations can be significantly more efficient than non-pushed-down operations). In contrast, in accordance with at least one embodiment of the invention, operations that are performed on a single column (e.g., predicate evaluation) are pushed down into each partition. The operation is performed according to the rules of that partition's data type. So, if a column has some DECIMAL(4,2) values and some INTEGER values, and the predicate is "column>43.234", then over the tuples that have DECIMAL values, the predicate is applied on DECIMALs. Over tuples that have INTEGER values, the predicate would be applied as "column>43". ("Column>43.234" and "column>43", as discussed here, are merely illustrative examples. In general, for an operation of the form {<column> <operator> <constant>}, the constant is rounded to a value in the data type of the partition being operated on.)

In accordance with at least one embodiment of the invention, pushed-down predicate evaluation is very helpful because it allows indexes to be used to apply predicates. Since each partition has a different data type, each will typically have a separate index. (It should be noted that methods in accordance with at least one embodiment of the invention do not require this; the same index could point to records with different data types for the index column, but this complicates the index design.) The predicate is applied separately on each partition using any indexes available on that partition. The query optimizer chooses the table access method separately for each partition.

Generally, in the context of at least one embodiment of the invention, operations that involve multiple columns can require that multiple columns from a table be brought together. The semantics of the operation is defined in terms of the data type of the columns involved, so we need a single canonical data type for that column. Thus, in accordance with at least one embodiment of the invention, there is maintained, in the catalog, for each flexible type column, the running "max type" to which all values of that column must be cast before applying SQL operations. For instance, by way of an illustrative example, if a column contains DECIMAL(10,2) and DECIMAL(11,2), and this column must participate in an addition (+) operation with another column, the max type is DECIMAL(11,2). The table access operator (index or scan) casts its output to this max type. So, for example, when doing a join between two tables whose join columns are of INTEGER type, the join columns are converted to the largest INTEGER precision needed to hold the values currently in the corresponding tables.

It should be understood that essentially any suitable computing device may be employed in accordance with at least one embodiment of the invention. As such, mobile phones, including smart phones, may easily incorporate arrangements such as those described and illustrated hereabove with respect to FIGS. 1-3.

Figure 4:
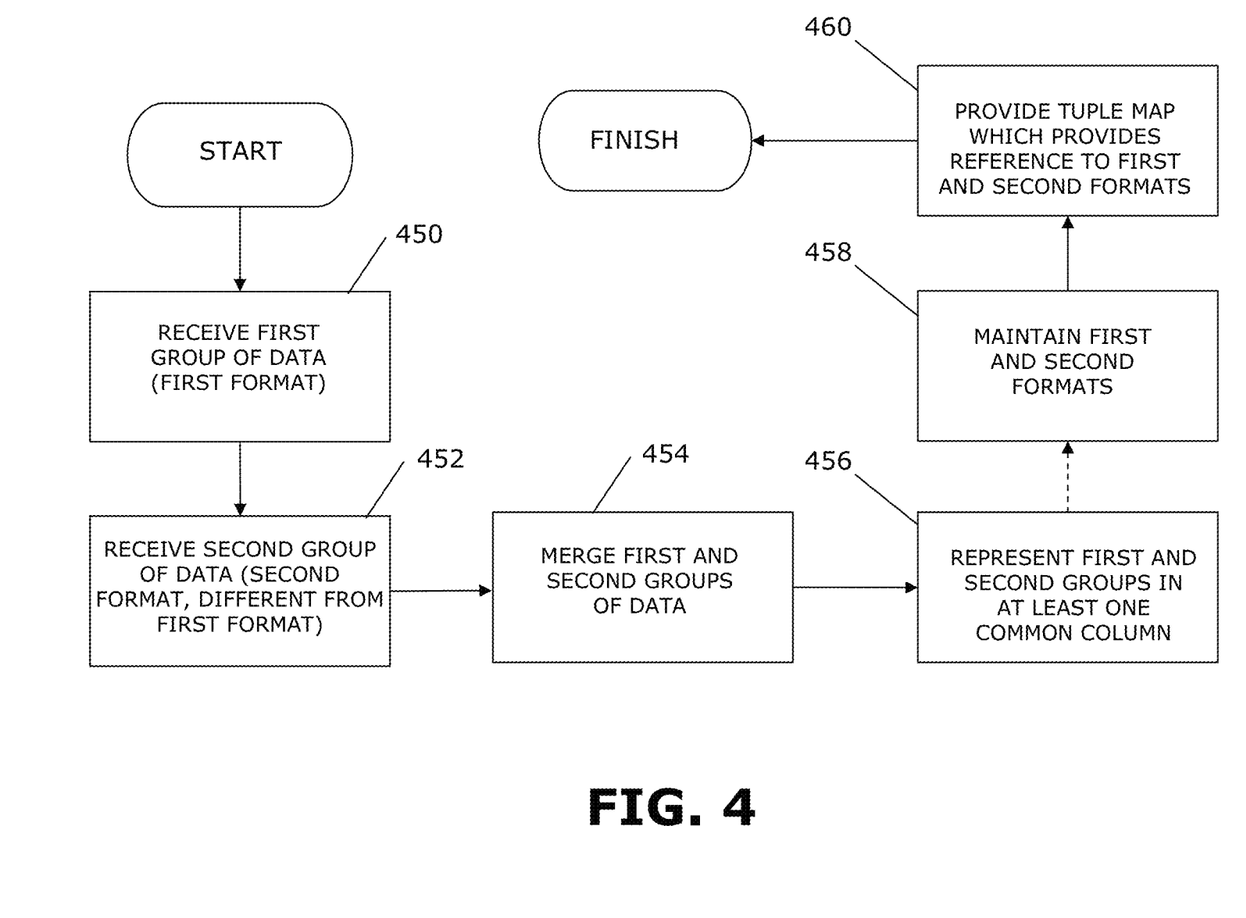
FIG. 4 sets forth a process more generally for providing database support.

FIG. 4 sets forth a process more generally for providing database support, in accordance with at least one embodiment of the invention. It should be appreciated that a process such as that broadly illustrated in FIG. 5 can be carried out on essentially any suitable computer system or set of computer systems, which may, by way of an illustrative and non-restrictive example, include a system such as that indicated at 12' in FIG. 5. In accordance with an example embodiment, most if not all of the process steps discussed with respect to FIG. 4 can be performed by way of a processing unit or units and system memory such as those indicated, respectively, at 16' and 28' in FIG. 5.

As shown in FIG. 4, in accordance with at least one embodiment of the invention, a first group of data are received (450), the first group of data being expressed in a first format, and a second group of data are received (452), the second group of data being expressed in a second format, the second format being different from the first format. The first and second groups of data are merged (454), and are represented in at least one common column (456). Such representing includes: maintaining the first and second formats (458); and providing a tuple map which provides reference to the first and second formats (460).

Figure 5:
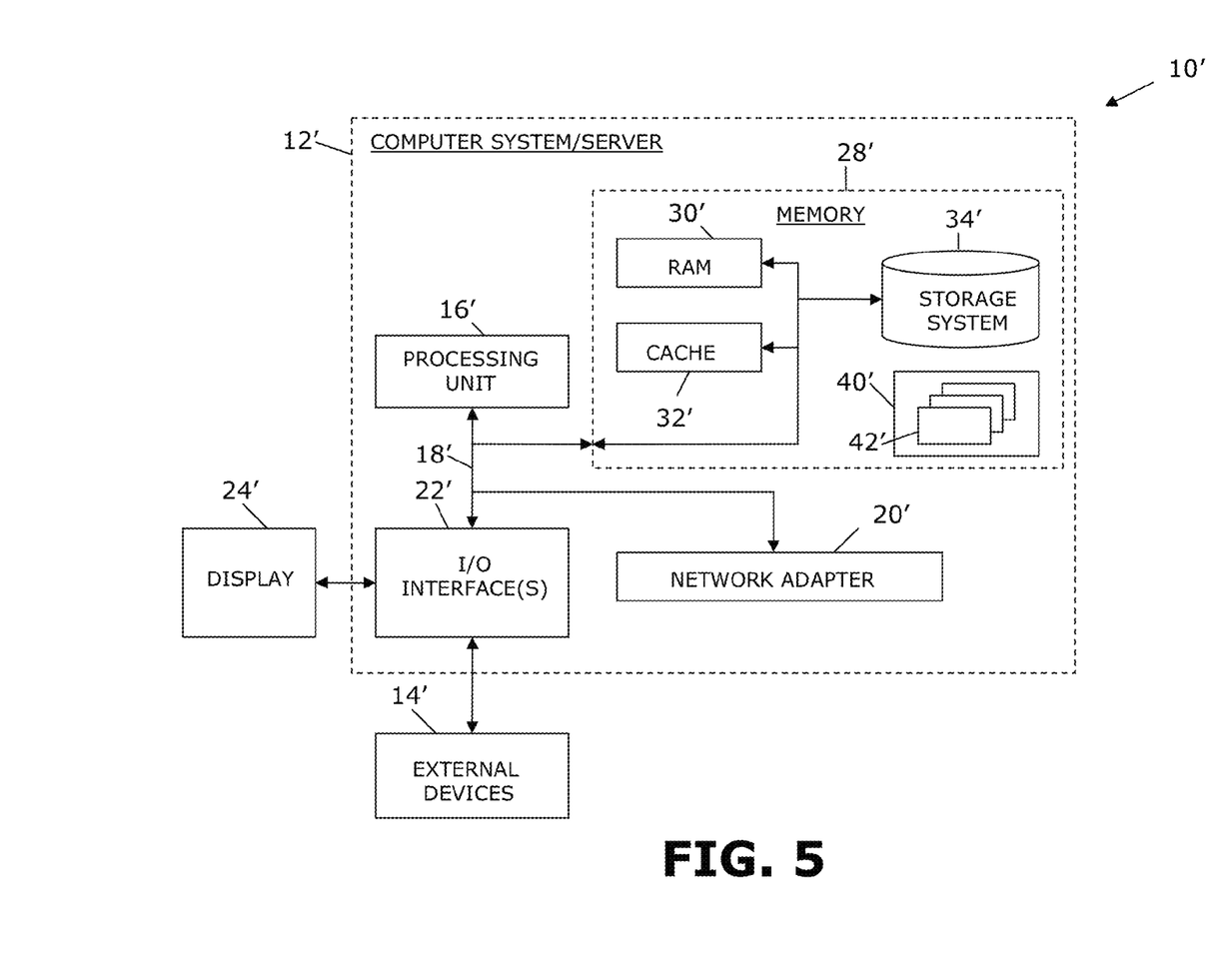
FIG. 5 illustrates a computer system.

Referring now to FIG. 5, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media, including memory storage devices.

As shown in FIG. 5, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer-readable medium having computer-readable program code embodied thereon.

Any combination of one or more computer-readable media may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by, or in connection with, an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
   receiving a first group of data, the first group of data being expressed in a first format;
   receiving a second group of data, the second group of data being expressed in a second format, the second format being different from the first format;
   merging the first and second groups of data;
   said merging comprises providing an order of data values which includes values from the first group of data and values from the second group of data;
   partitioning the merged data into first and second blocks;
   said partitioning comprising storing the first group of data in the first block and storing the second group of data in the second block; and
   representing the first and second groups of data in at least one common column;
   said representing comprising:
   maintaining the first and second formats; and
   providing a tuple map which provides reference to the first and second formats, the tuple map comprising a data structure which provides reference to values from the first group of data and to values from the second group of data, and in an order corresponding to the merged order of data values.

2. The method according to claim 1, wherein the merged data are represented in column-major fashion.

3. The method according to claim 2, wherein:
the data structure of the tuple map comprises identifiers for the first and second groups of data; and
the identifiers for the first and second groups of data are disposed adjacent to and interspersed with one another.

4. The method according to claim 1, wherein:
the merged data are contained in rows and columns; and
the rows are partitioned by way of a cross-product of formats corresponding to each of the columns, the formats comprising the first and second formats.

5. The method according to claim 1, wherein said representing comprises partitioning the data with respect to the first and second formats.

6. The method according to claim 1, where the first and second formats correspond to different data types for values from a common column.

7. The method according to claim 1, where the first and second formats correspond to null and non-null values for values from a common column.

8. The method according to claim 1, wherein said receiving of a first group of data comprises receiving the first group of data from a first database.

9. The method according to claim 8, wherein said receiving of a second group of data comprises receiving the second group of data from a second database.

10. An apparatus comprising:
at least one processor; and
a computer readable storage medium having computer readable program code embodied therewith and executable by the at least one processor, the computer readable program code comprising:
computer readable program code configured to receive a first group of data, the first group of data being expressed in a first format;
computer readable program code configured to receive a second group of data, the second group of data being expressed in a second format, the second format being different from the first format;
computer readable program code configured to merge the first and second groups of data;
wherein the merging comprises providing an order of data values which includes values from the first group of data and values from the second group of data;
computer readable program code configured to partition the merged data into first and second blocks;
wherein the partitioning comprises storing the first group of data in the first block and storing the second group of data in the second block; and
computer readable program code configured to represent the first and second groups of data in at least one common column via:
maintaining the first and second formats; and
providing a tuple map which provides reference to the first and second formats the tuple map comprising a data structure which provides reference to values from the first group of data and to values from the second group of data, and in an order corresponding to the merged order of data values.

11. A computer program product for providing database support, said computer program product comprising a non-transitory computer readable storage medium having computer readable program code embodied therewith, said computer readable program code being executable by a computer to:
receive a first group of data, the first group of data being expressed in a first format;
receive a second group of data, the second group of data being expressed in a second format, the second format being different from the first format;
merge the first and second groups of data;
wherein the merging comprises providing an order of data values which includes values from the first group of data and values from the second group of data;
partition the merged data into first and second blocks;
wherein the partitioning comprises storing the first group of data in the first block and storing the second group of data in the second block; and
represent the first and second groups of data in at least one common column via:
maintaining the first and second formats; and
providing a tuple map which provides reference to the first and second formats the tuple map comprising a data structure which provides reference to values from the first group of data and to values from the second group of data, and in an order corresponding to the merged order of data values.

12. The computer program product according to claim 11, wherein the merged data are represented in column-major fashion.

13. The computer program product according to claim 11, wherein:
the merged data are contained in rows and columns; and
the rows are partitioned by way of a cross-product of formats corresponding to each of the columns, the formats comprising the first and second formats.

14. The computer program product according to claim 11, wherein said computer readable program code is further executable by the computer to partition the data with respect to the first and second formats.

15. The computer program product according to claim 11, where the first and second formats correspond to different data types for values from a common column.

16. The computer program product according to claim 11, where the first and second formats correspond to null and non-null values for values from a common column.

* * * * *